(12) United States Patent
Yamamoto

(10) Patent No.: US 11,263,494 B2
(45) Date of Patent: Mar. 1, 2022

(54) CLASSIFICATION DEVICE, CLASSIFICATION METHOD, PROGRAM, AND INFORMATION RECORDING MEDIUM

(71) Applicant: RIKEN, Wako (JP)

(72) Inventor: Yoichiro Yamamoto, Wako (JP)

(73) Assignee: RIKEN, Wako (JP)

( * ) Notice: Subject to any disclaimer, the term of this patent is extended or adjusted under 35 U.S.C. 154(b) by 42 days.

(21) Appl. No.: 16/763,417

(22) PCT Filed: Nov. 6, 2018

(86) PCT No.: PCT/JP2018/041174
§ 371 (c)(1),
(2) Date: May 12, 2020

(87) PCT Pub. No.: WO2019/102844
PCT Pub. Date: May 31, 2019

(65) Prior Publication Data
US 2021/0073595 A1    Mar. 11, 2021

(30) Foreign Application Priority Data

Nov. 21, 2017  (JP) .............................. JP2017-223696

(51) Int. Cl.
*G06K 9/00* (2006.01)
*G06K 9/62* (2022.01)
*G06N 3/04* (2006.01)

(52) U.S. Cl.
CPC ............. *G06K 9/6267* (2013.01); *G06N 3/04* (2013.01)

(58) Field of Classification Search
CPC ............................... G06K 9/6267; G06N 3/02
See application file for complete search history.

(56) References Cited

U.S. PATENT DOCUMENTS 5,754,676 A    5/1998  Yasuhiro et al.
2004/0101181 A1    5/2004  Giger et al.

FOREIGN PATENT DOCUMENTS

| JP | 07-284090 | 10/1995 |
| JP | 2016-144598 | 8/2016 |
| JP | 2017-045341 | 3/2017 |

OTHER PUBLICATIONS

Chen Kai et al., "Attribute-Based Supervised Deep Learning Model for Action Recognition", Frontiers of Computer Science, vol. 11, No. 2, Feb. 22, 2017, pp. 219-229, Springer, Berlin Heidelberg. (Year: 2017).*

(Continued)

*Primary Examiner* — Andrew M Moyer
*Assistant Examiner* — Denise G Alfonso
(74) *Attorney, Agent, or Firm* — Ohlandt, Greeley, Ruggiero and Perle, LLP

(57) ABSTRACT

A classification device for classifying targets using a neural network on the basis of a target image that captures each target and at least one attribute parameter associated with the target. The classification device is equipped with a receiver, a neural network unit, and a classifier. The receiver receives a target image that captures a target and at least one attribute parameter associated with the target. The classifier classifies targets using the neural network unit. In the neural network unit, a convolution operator convolves individual elements of a provided feature map and the received at least one attribute parameter.

10 Claims, 15 Drawing Sheets

(56) References Cited

OTHER PUBLICATIONS

S. Albawi, T. A. Mohammed and S. Al-Zawi, "Understanding of a convolutional neural network," 2017 International Conference on Engineering and Technology (ICET), 2017, pp. 1-6 (Year: 2017).*

Bargoti et al., "Image Segmentation for Fruit Detection and Yield Estimation in Apple Orchards", Australian Centre for Field Robotics The University of Sydney, Oct. 25, 2016, pp. 1-27 (Year: 2016).*

Chen Kai et al., "Attribute-Based Supervised Deep Learning Model for Action Recognition", Frontiers of Computer Science, vol. 11, No. 2, Feb. 22, 2017, pp. 219-229, Springer, Berlin Heidelberg.

Lan Hui-Ying et al., "DLPlib: A Library for Deep Learning Processor", Journal of Computer Science and Technology, vol. 32, No. 2, Mar. 13, 2017, pp. 286-296, Science Press, Beijing, CN.

Extended European Search Report dated Jul. 2, 2021 in counterpart European patent application No. 18880401.7, 10 pgs.

Hamada, Masahiro et al., "Proposal of Medical Imaging Diagnosis System by Neural Networks used Clinical Information". Proceedings of the 51th Annual Conference of the Institute of Systems, Control and Information Engineers [CD-ROM], May 16, 2007, pp. 633-634 (Abstract).

International Search Report dated Dec. 4, 2018 in corresponding PCT International Patent Application PCT/JP2018/041174, 2 pages.

\* cited by examiner

CLASSIFICATION DEVICE, CLASSIFICATION METHOD, PROGRAM, AND INFORMATION RECORDING MEDIUM

TECHNICAL FIELD

The present disclosure relates to a classification device, a classification method, a program, and a non-transitory information recording medium appropriate for classification of targets using a neural network on the basis of a target image that captures each target and at least one attribute parameter associated with the target.

BACKGROUND ART

Some existing techniques have been proposed for classifying images using a neural network having convolution layers.

In such a convolution neural network, pooling layers (partial sampling layers) are disposed between the convolution layers as required to convolve local data on an image in a hierarchical manner, thereby achieving classification of the image at a high accuracy. The convolution layers and the pooling layers are alternately disposed in general existing techniques. In contrast, recent studies have focused on a technique for performing learning and determination mainly with the convolution layers, without a pooling layer or using a reduced number of pooling layers as required.

At the learning stage of this technique, a large number of images of targets (for example, various types of photographs) are prepared in advance, and some of the images of which classification results have already been provided are selected as supervision data and learned by the convolution neural network. At the classification stage, an image to be classified (image of which a classification result has not yet provided) is input to the convolution neural network, from which a feature map (represented by a binary, scalar, vector, or matrix value) is output and used for classification.

In order to perform these functions of the neural network, a graphic processing unit (GPU) suitable for image processing and serving as a coprocessor is widely used to perform rapid learning and determination under the control of a central processing unit (CPU) included in a computer.

Patent Literature 1 discloses a method for diagnosis of skin diseases using a skin image. Specifically, the disclosed method involves providing a first convolution network with a first image generated by a first conversion to the skin image, providing a second convolution network with a second image generated by a second conversion to the skin image, and conducting determination based on integration of the values output from the two convolution networks.

In the current diagnosis of corneal endothelium, a doctor or medical technician takes a photograph of corneal endothelial cells of a patient and measures properties, such as a density and an area of the corneal endothelial cells and a rate of occurrence of hexagonal cells, by a manual operation or a combination of manual operation and semiautomatic operation using a computer, in order to determine whether the patient needs an intraocular surgery, such as cataract surgery. The doctor determines the level of risk of intraocular surgery for the patient and the necessity of the intraocular surgery in consideration of the measured properties.

The convolution neural network seems to be effective for such determination of the level of risk in a symptom of a patient based on a photograph of a part where the symptom is likely to occur.

The doctor, in contrast, diagnoses a disease and determines the level of risk not only based on visual observation of a diseased area or a photograph thereof but also in integrated consideration of various attribute parameters of the patient, such as age, sex, height, weight, degree of obesity, and bone density.

The technique disclosed in Patent Literature 1 uses integration of the values output from the two convolution neural networks. This technique appears to readily achieve integration of an image of a target and attribute parameters of the target.

CITATION LIST

Patent Literature

Patent Literature 1: Unexamined Japanese Patent Application Publication No. 2017-45341

SUMMARY OF INVENTION

Technical Problem

In the technique disclosed in Patent Literature 1, the values output from the convolution neural networks are averaged, for example, and are thereby integrated to yield a final determination value. This configuration, even based on simple average, can provide an acceptable discrimination performance. This phenomenon seems to occur because the images provided to the convolution neural networks are generated by conversion of the identical original image.

Unfortunately, such simple "average" is not applicable to integration of a value derived from an image and a value derived from an attribute parameter other than an image. In addition, in the case of using a weighted mean value as "average", determination of appropriate weights is difficult.

The libraries named TensorFlow and Keras for allowing a GPU to achieve the neural network have a library function named Concatenate for simply concatenating a plurality of output values. Unfortunately, the Concatenate function is incapable of sufficient adjustment of weights used in concatenation of the values and cannot contribute to highly-accurate classification.

Accordingly, a technique for classifying targets using a neural network on the basis of a target image that captures each target and at least one attribute parameter associated with the target is in strong demand.

The disclosure, which has been accomplished to solve the above problems, is related to a classification device, a classification method, a program, and a non-transitory information recording medium for classifying targets using a neural network on the basis of a target image that captures each target and at least one attribute parameter associated with the target.

Solution to Problem

A classification device according to one aspect of the disclosure receives a target image that captures a target and at least one attribute parameter associated with the target, and classifies the target using a neural network. The neural network includes a convolution operator configured to convolve individual elements of a provided feature map and the received at least one attribute parameter.

Advantageous Effects of Invention

The disclosure can provide a classification device, a classification method, a program, and a non-transitory information recording medium for classifying targets using a neural network on the basis of a target image that captures each target and at least one attribute parameter associated with the target.

DESCRIPTION OF EMBODIMENTS

Embodiments of the disclosure will now be described. These embodiments are provided for explanation purposes only and do not limit the scope of the disclosure. Persons skilled in the art can replace some or all of the components of the embodiments with their equivalents to configure other embodiments. Some of the components of the embodiments described below may be appropriately omitted depending on the usage. That is, any embodiment configured in accordance with the principle of the disclosure is encompassed in the scope of the disclosure.

Configuration

Figure 1:
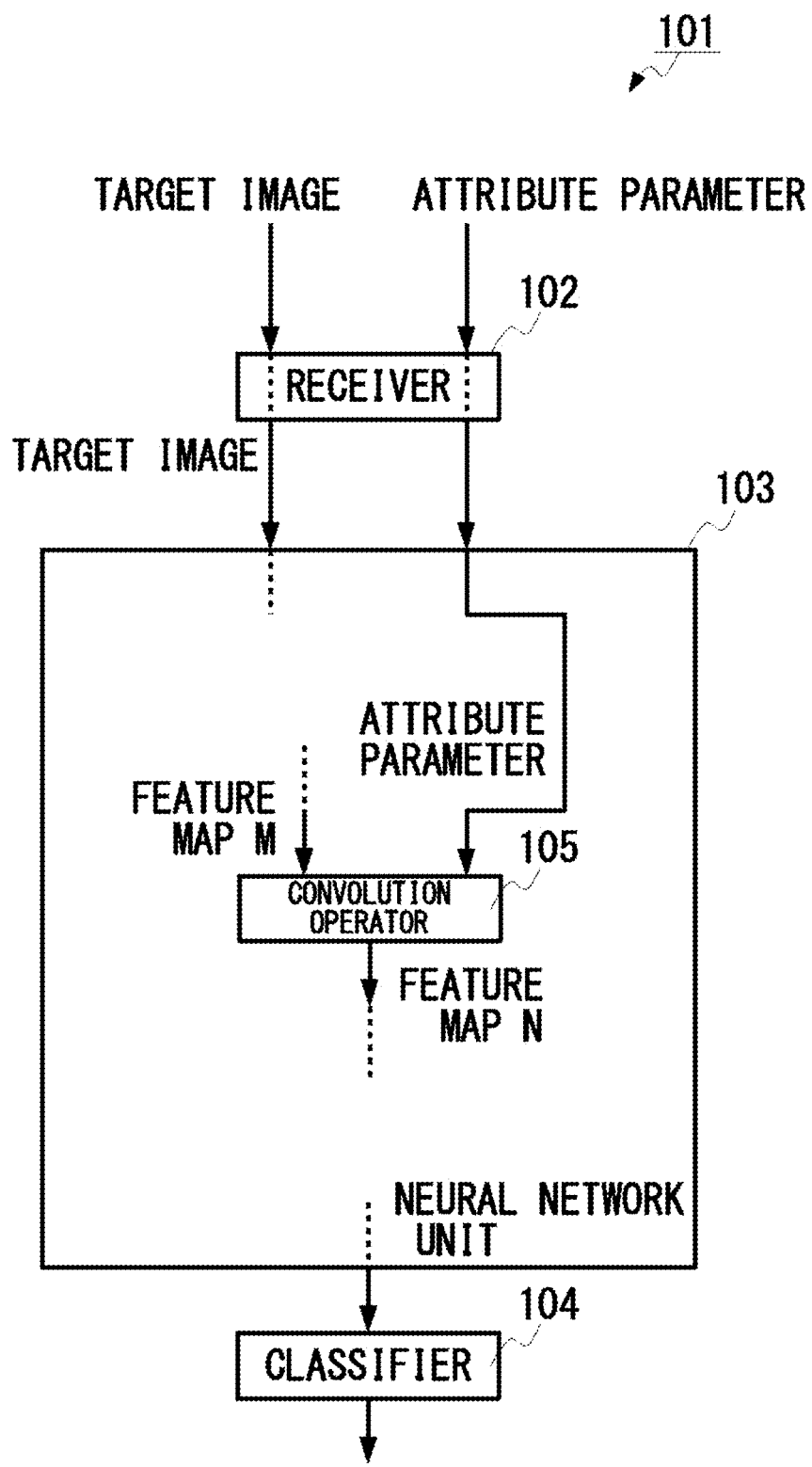
FIG. 1 is an explanatory diagram illustrating a schematic configuration of a classification device according to an embodiment of the disclosure.

FIG. 1 is an explanatory diagram illustrating a schematic configuration of a classification device according to an embodiment of the disclosure. This schematic configuration will now be described with reference to FIG. 1.

As illustrated in this figure, a classification device 101 according to the embodiment is equipped with a receiver 102, a neural network unit 103, and a classifier 104.

This classification device 101 is typically achieved by execution of a program by a computer. This computer is connected to various output devices and input devices and thus transmits and receives information to and from these devices.

The program executed in the computer may be distributed and sold by a server communicably connected to the computer. Alternatively, the program may be stored on a non-transitory information recording medium, such as a compact disk read only memory (CD-ROM), a flash memory, or an electrically erasable programmable ROM (EEPROM), and this information recording medium may be distributed and sold, for example.

The program is installed in a non-transitory information recording medium, such as a hard disk, a solid state drive, a flash memory, or an EEPROM, included in a computer. This computer can achieve an information processing system according to the embodiment. In general, the CPU of the computer loads the program from the non-transitory information recording medium into a random access memory (RAM) and interprets and executes the codes contained in the program, under the management of the operating system (OS) of the computer. It should be noted that explicit loading of the program into the RAM may be unnecessary in an architecture in which the non-transitory information recording medium can be mapped in a memory space accessible by the CPU. The RAM can temporarily store various types of data required in the process of execution of the program.

The computer is equipped with a GPU as described above, which should preferably contribute to rapid operations of various image processing. The computer uses the GPU and libraries, such as TensorFlow, and thereby performs the learning and classifying functions in various AI calculations, under the control of the CPU.

The information processing system according to the embodiment may be configured by a dedicated electronic circuit instead of a general-purpose computer. In this case, the program may also serve as a material for generating an electronic circuit diagram or a timing chart. The electronic circuit that satisfies the specification defined in the program is composed of a field programmable gate array (FPGA) or an application specific integrated circuit (ASIC) in this case. This electronic circuit functions as a dedicated device performing the functions defined in the program and thus configures the information processing system according to the embodiment.

The following description assumes that the classification device 101 is achieved by execution of the program by the computer, in order to facilitate an understanding.

The receiver 102 receives an image of a target to be classified and at least one attribute parameter associated with the target input to the receiver 102.

The neural network unit 103 includes at least one convolution layer, typically a plurality of convolution layers (not shown). As described above, a pooling layer is disposed between two convolution layers as required (not shown).

When a feature map is input to each convolution layer, the feature map is convolved to generate a new feature map. In the configuration including a pooling layer, the feature map output from the convolution layer is subject to a sampling operation to generate a new feature map. The resulting feature map is transferred to another convolution layer. This convolution operation is repeatedly executed.

In the convolution layer, the convolution of a plurality of elements involves calculation of the linear sum. The coefficients of the linear sum are automatically adjusted by backpropagation at the learning stage in the neural network.

In this embodiment, a convolution operator 105 for another completion operation is provided before, after, or during the above-described repetition of the convolution (and pooling) operation, so as to convolve the individual elements of the feature map M and the received at least one attribute parameter.

The convolution of the individual pixels of the image representing the feature map M and at least one attribute parameter yields a feature map N having the size identical to the original image.

In general, the convolution of the individual elements $M[i_1, i_2, \ldots, i_L]$ of a feature map M having L dimensions and the A number of attribute parameters $p_1, p_2, \ldots,$ and $P_A$ provides a new feature map N having L dimensions. The elements $N[i_1, i_2, \ldots, i_L]$ of the feature map N resulting from the convolution operation are represented by:

$$N[i_1, i_2, \ldots, i_L] = w_0 M[i_1, i_2, \ldots, i_L] + \Sigma_{j=1}^{A} w_j p_j$$

where $w_0, w_1, w_2, \ldots,$ and $w_A$ indicate weight coefficients.

That is, the obtained image data and the attribute parameters of the target are integrally embedded in the feature map resulting from the convolution operation.

In addition, the weight coefficients $w_0, w_1, w_2, \ldots,$ and $w_A$ used in the integration of the image data and the attribute parameters are automatically adjusted by backpropagation at the learning stage in the neural network. The weights in integration of multiple types of information are thus appropriately determined using the learning data prepared in advance. This point is one of the characteristics of the embodiment.

The classifier 104 classifies targets on the basis of an output from the neural network unit 103. Specifically, the classifier 104 classifies targets on the basis of the feature value (binary, scalar, vector, or matrix value) finally output from the neural network unit 103.

As described above, the classification device 101 according to the embodiment is characterized in that the individual elements of an input feature map and input attribute parameters are convolved in a convolution layer in a certain step and then transferred to the subsequent step. The other configurations may be identical to those of various known techniques related to convolution neural networks.

The embodiment will now be described, appropriately referring to the case of determining the level of risk of intraocular surgery using an image of corneal endothelial cells in a subject and attribute parameters including the age of the subject.

Figure 2:
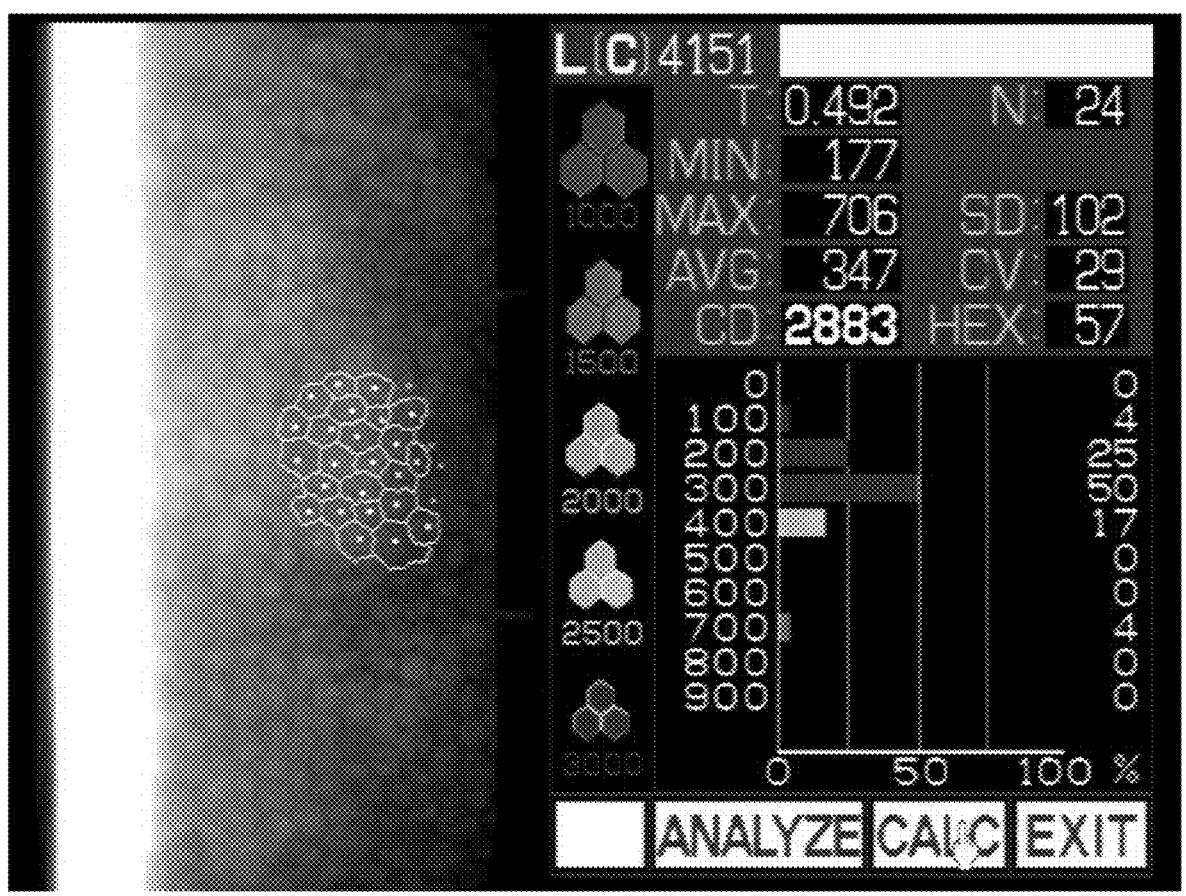
FIG. 2 is a substitute photograph for the figure for illustrating an exemplary medical photograph of corneal endothelial cells in a healthy subject.

FIG. 2 is a substitute photograph for the figure for illustrating an exemplary medical photograph of corneal endothelial cells in a healthy subject.

Figure 3:
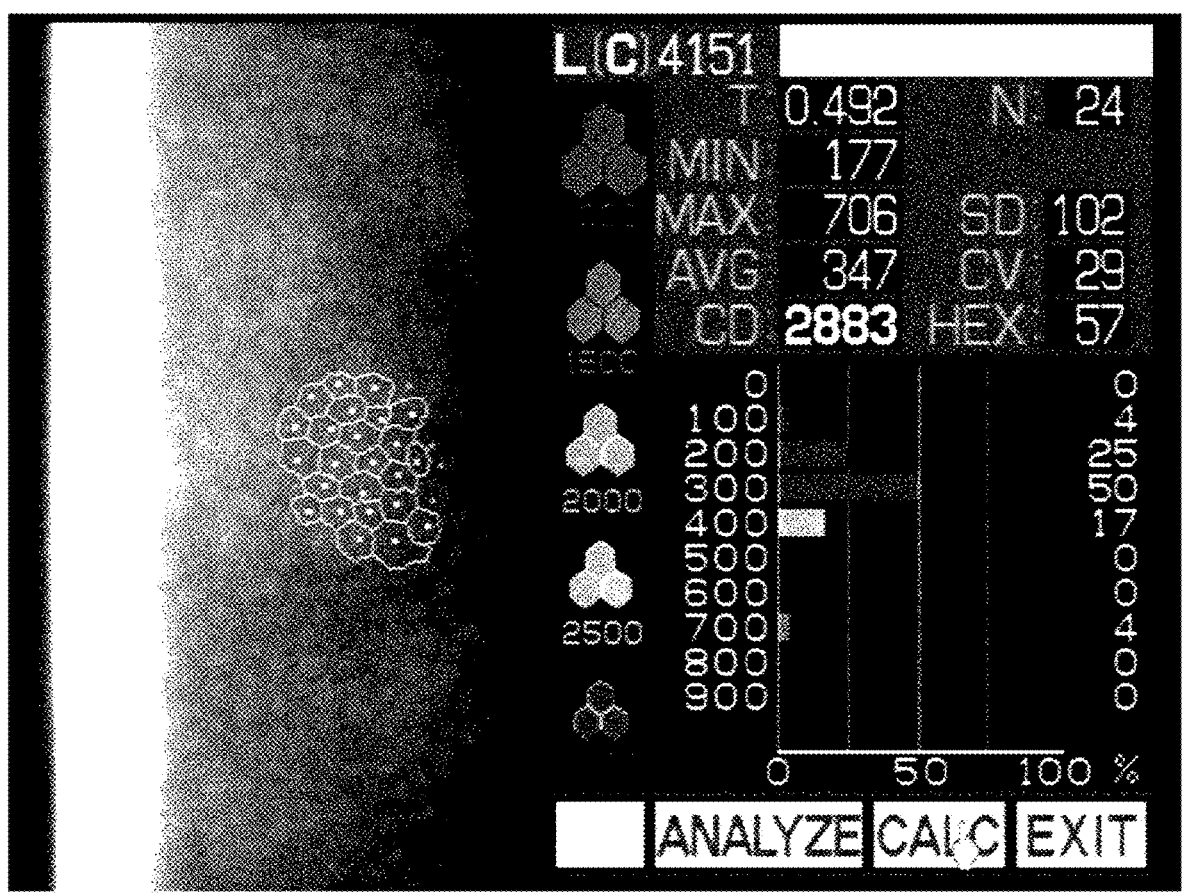
FIG. 3 is an explanatory diagram illustrating the medical photograph of the corneal endothelial cells in the healthy subject in a monochrome mode.

FIG. 3 is an explanatory diagram illustrating the medical photograph of the corneal endothelial cells in the healthy subject in a monochrome mode.

Figure 4:
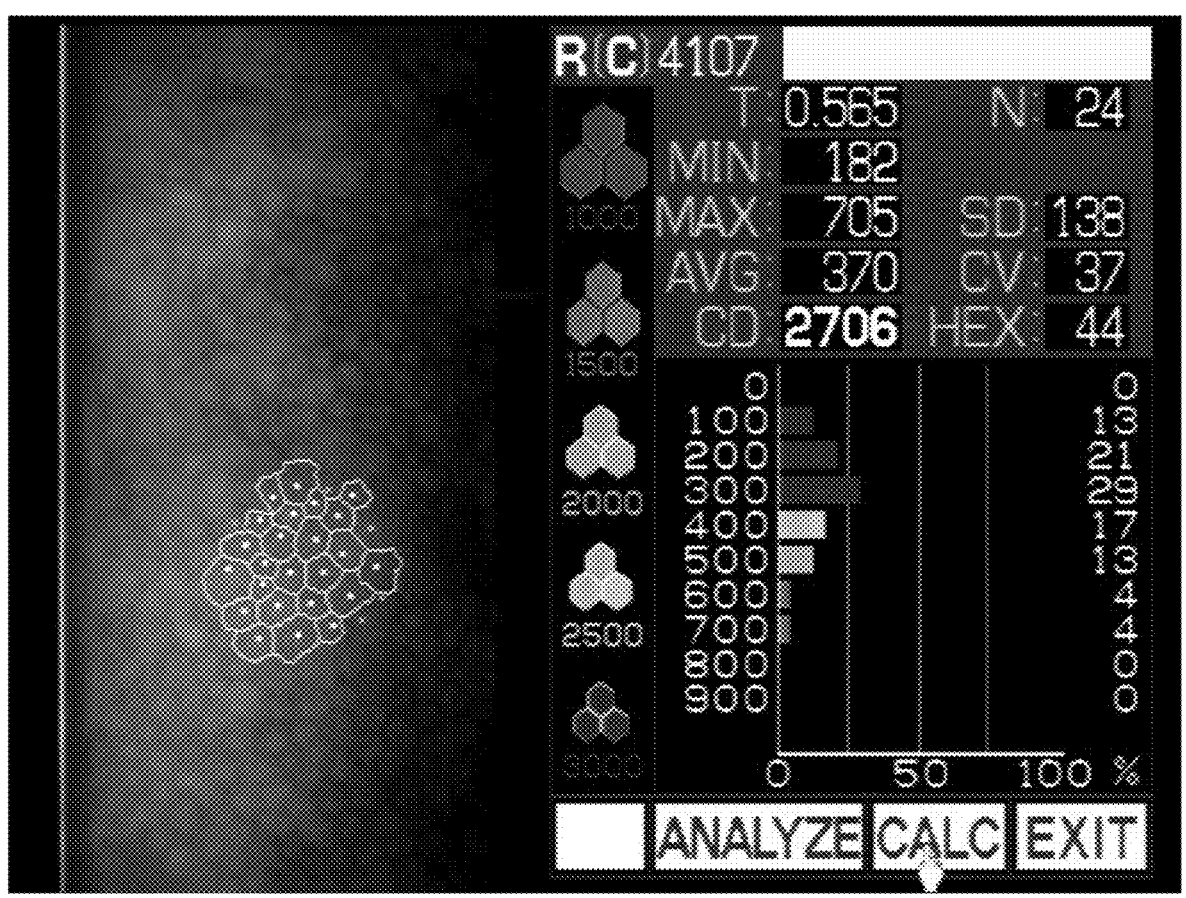
FIG. 4 is a substitute photograph for the figure for illustrating an exemplary medical photograph of corneal endothelial cells in a diseased subject.

FIG. 4 is a substitute photograph for the figure for illustrating an exemplary medical photograph of corneal endothelial cells in a diseased subject.

Figure 5:
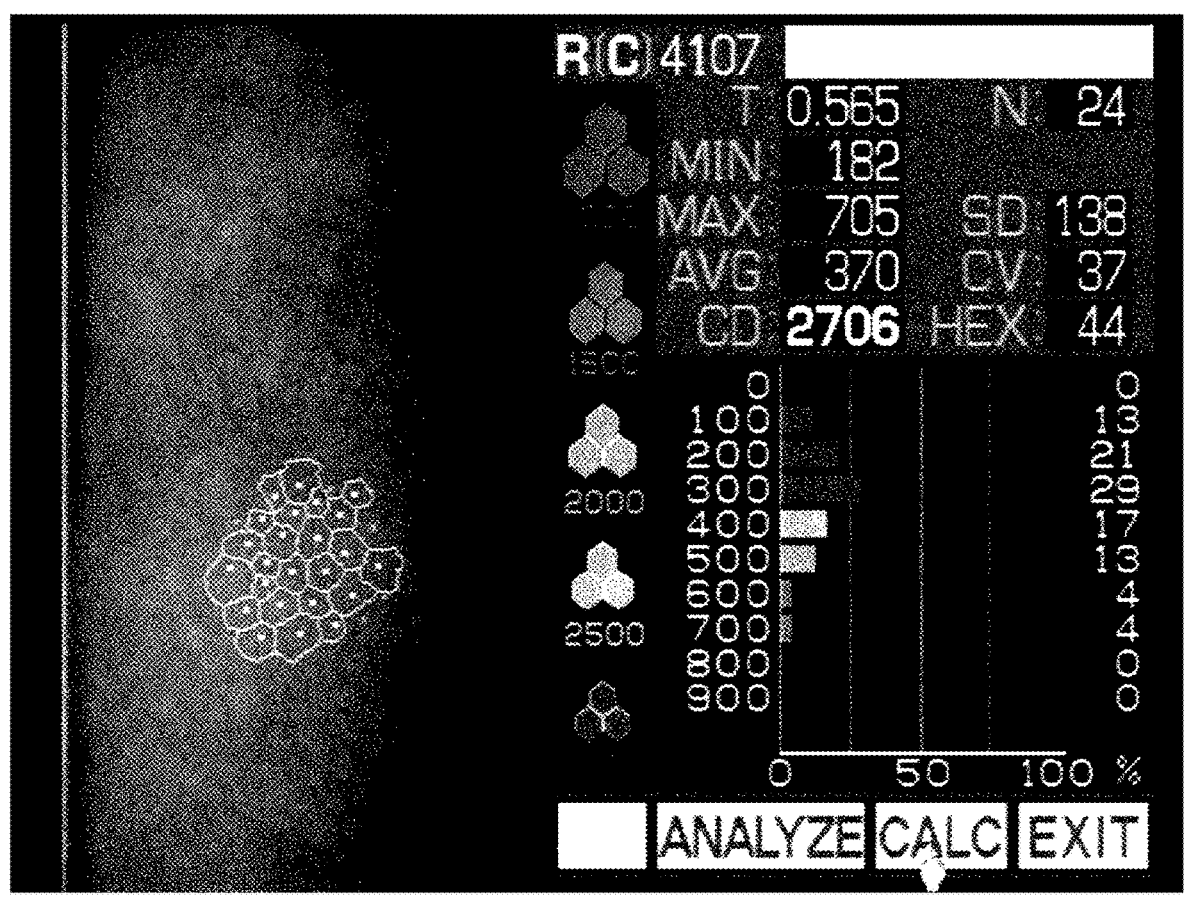
FIG. 5 is an explanatory diagram illustrating the medical photograph of the corneal endothelial cells in the diseased subject in a monochrome mode.

FIG. 5 is an explanatory diagram illustrating the medical photograph of the corneal endothelial cells in the diseased subject in a monochrome mode.

These images were used in clinical practice and are introduced to verify the performance of the classification device according to the embodiment.

The left part of each image is composed of a photograph capturing corneal endothelial cells and the right part is composed of an image including text data, such as capturing date and time and subject number.

In the photograph in the left part, some of the cells are provided with white dots at the centers of the cells and with white lines along the boundaries between the cells. In an area that clearly captures the cells, a doctor or medical technician has drawn the white dots at the centers of the cells and then drawn the white lines with reference to the white dots using a testing apparatus that conducts image recognition for the boundaries between the cells.

The testing apparatus calculates information, such as a density and an area of corneal endothelial cells and a rate of occurrence of hexagonal cells, based on these white lines. The calculated information is rendered as text data in the right part of the image.

The photograph in the left part has a pixel size of approximately 300×480 dots. In this embodiment, small image segments having a pixel size of 56×56 dots are extracted from the area of the image that does not include white lines or dots. The extracted image segments are used as target images in learning and determination.

Figure 6:
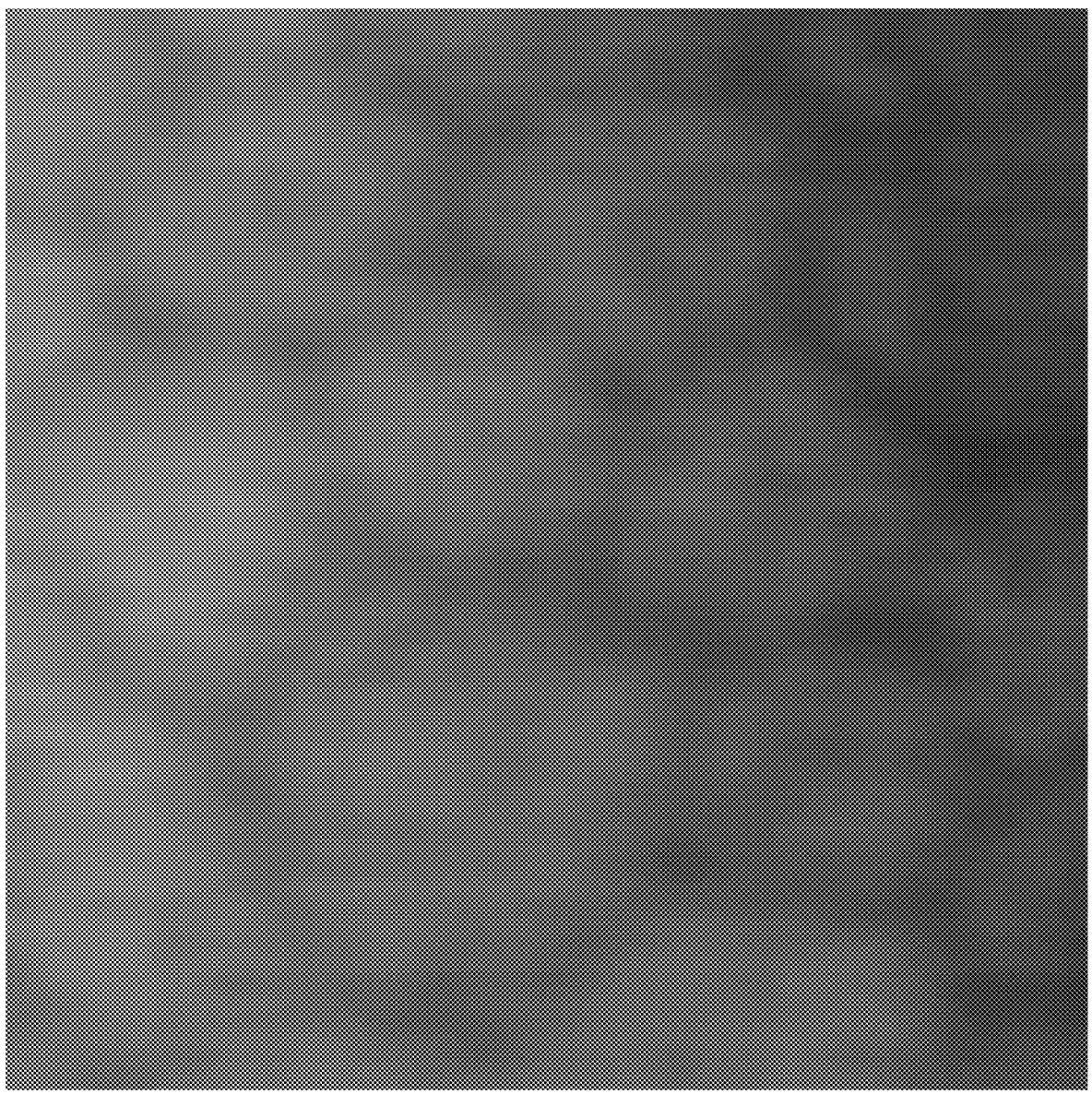
FIG. 6 is a substitute photograph for the figure for illustrating an exemplary target image of a healthy subject.

FIG. 6 is a substitute photograph for the figure for illustrating an exemplary target image of a healthy subject.

Figure 7:
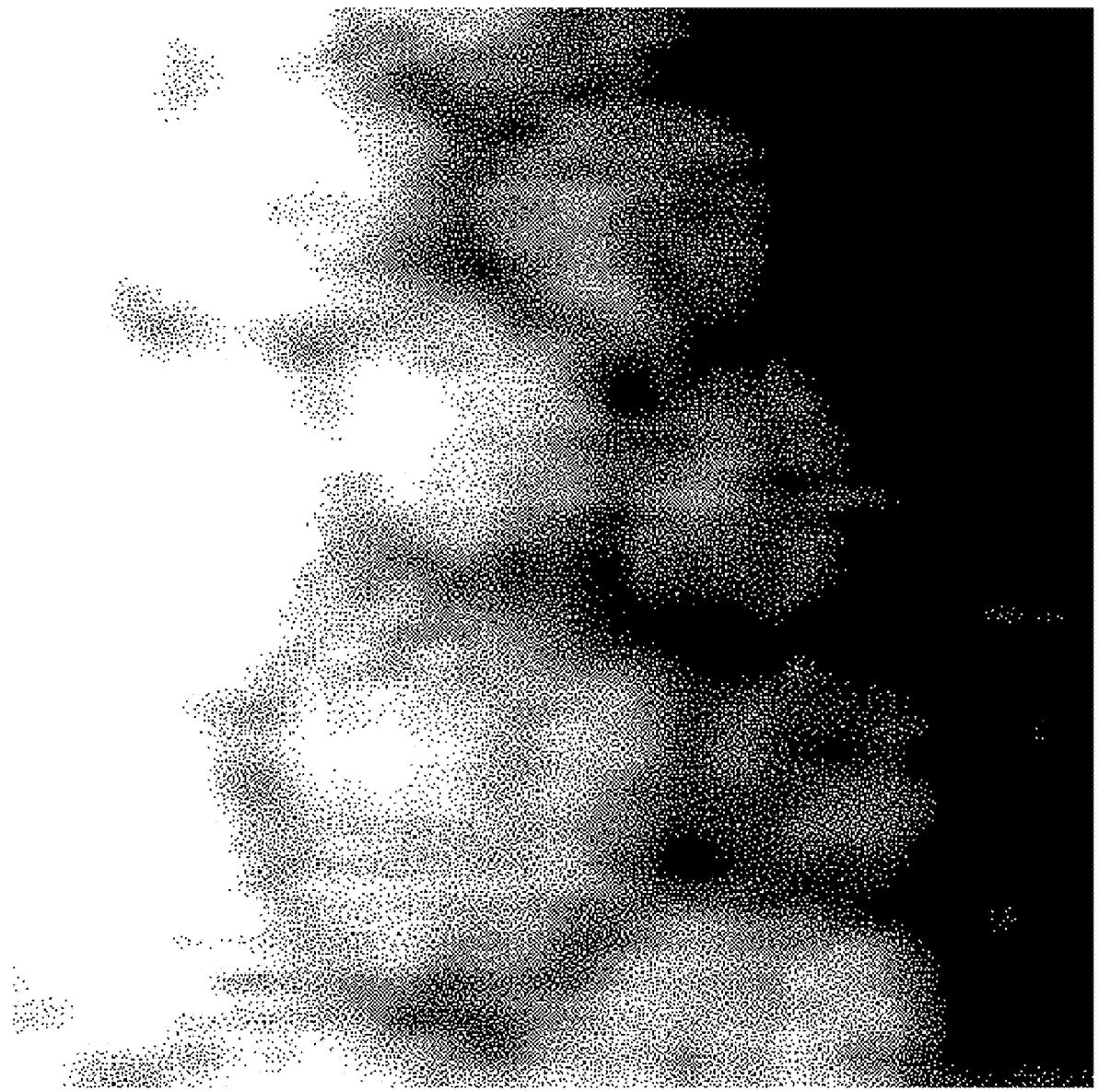
FIG. 7 is an explanatory diagram illustrating the target image of the healthy subject in a monochrome mode.

FIG. 7 is an explanatory diagram illustrating the target image of the healthy subject in a monochrome mode.

Figure 8:
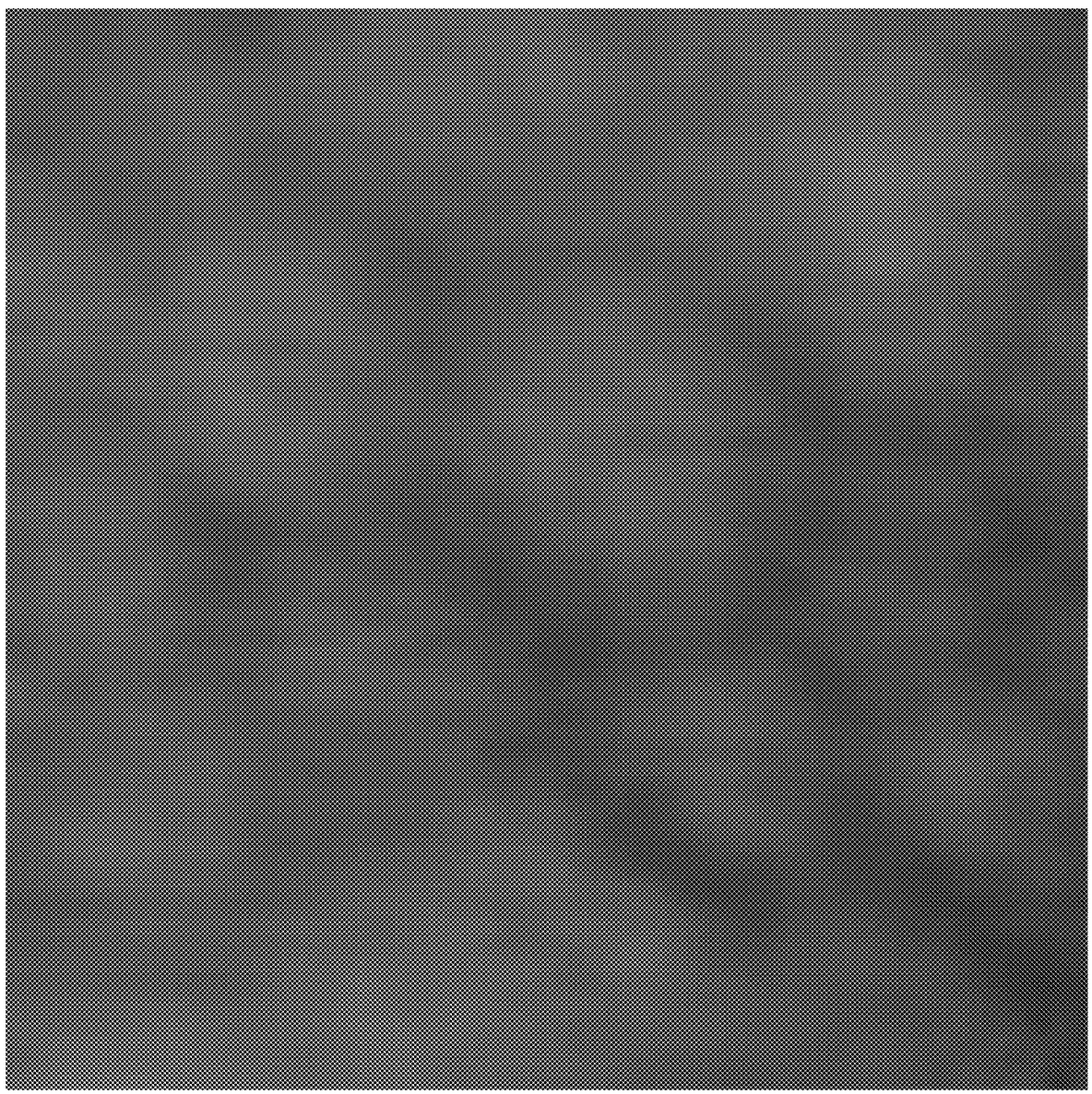
FIG. 8 is a substitute photograph for the figure for illustrating an exemplary target image of a diseased subject.

FIG. 8 is a substitute photograph for the figure for illustrating an exemplary target image of a diseased subject.

Figure 9:
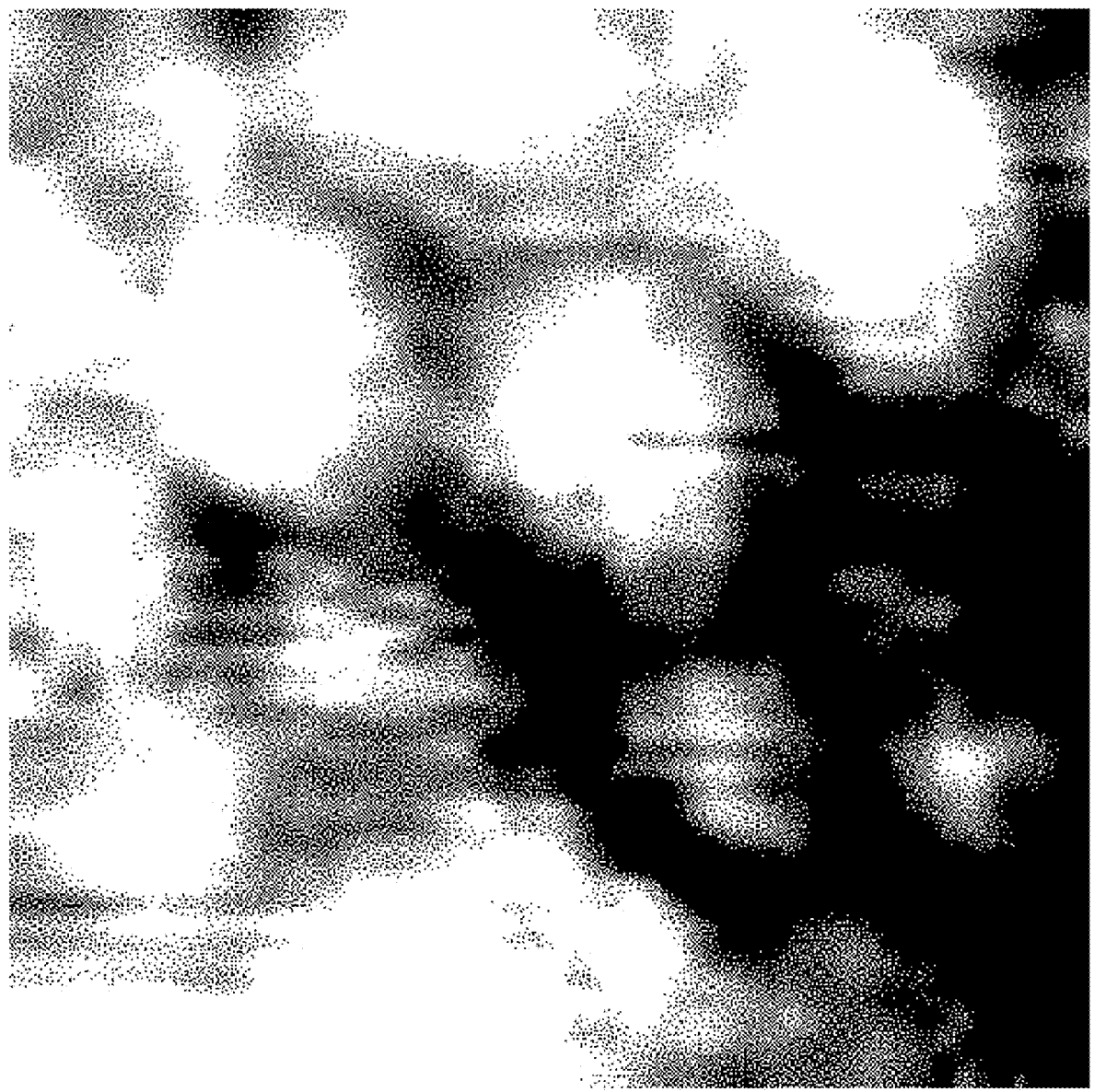
FIG. 9 is an explanatory diagram illustrating the target image of the diseased subject in a monochrome mode.

FIG. 9 is an explanatory diagram illustrating the target image of the diseased subject in a monochrome mode.

As illustrated in these figures, target images alone used in this embodiment are not always clear. The embodiment is characterized in that such unclear target images can also be used for classification of subjects with a sufficient accuracy. It should be noted that the size and number of target images may be appropriately varied depending on the applied usage.

In this specific example, the age of a subject is used as a single attribute parameter $p_1$. A numerical value representing the age is the age itself in the simplest procedure. Alternatively, a certain range of ages may be represented by a digit in the tens place of the ages, for example. The years of age may be replaced with the months or days of age counted from the birthday.

If other attribute parameters, such as height and weight, are introduced in addition to the age, then these attribute parameters should be converted into numerical values.

The scalar values, such as height and weight, may be used in the original form or appropriately converted into the form of pixel values (in general, 0 to 255 or 0 to 65535).

If any attribute of the subject, such as sex or residential address, having some categories is introduced as an attribute parameter, then the attribute parameter may be represented using category numbers such that the value 0 indicates male and the value 1 indicates female, for example. Alternatively, an attribute parameter may be prepared for each of the categories and represented by a logical value indicating whether the subject falls into the category. For example, male is represented by $p_k=1$, $p_{k+1}=0$, while female is represented by $p_k=0$, $p_{k+1}=1$, where k indicates an appropriate positive constant.

If the residential address is categorized into any of the B number of regions, for example, attribute parameters $p_h$, $p_{h+1}$, $p_{h+2}$, ..., and $p_{h+B-1}$ (h indicates an appropriate positive constant) are prepared. The logical value for each category is thus represented using a binary value as follows:

$$p_{h+b} = 1;$$

$$p_{h+i} = 0 (i \neq b)$$

where b indicates a region number ($0 \leq b \leq 9$).

Each of the target images has two dimensions provided that the images are depicted in gray scale. In this embodiment, as described above, the individual pixels M[x,y] (x=0, 1, ..., W−1; y=0, 1, ..., H−1) of the image M having a width W and a height H and the attribute parameter $p_1$ indicating the age are subject to a convolution operation represented by:

$$N[x,y] = w_0 M[x,y] + w_1 p_1$$

The convolution operation in the library using a GPU can achieve rapid calculation of the linear sum of the pixel values of the pixel at a focused site and its surrounding pixels for each site in the image.

The amount of a single displacement of the focused site is called a stride, and the size of a subarea including the pixel at the focused site and its surrounding pixels is called a kernel size. An array of coefficients of linear sum corresponding to the subarea for receiving the convolution operation is called a kernel or convolution kernel.

Accordingly, in order to rapidly execute the above-explained convolution operation in the library using the GPU, a kernel including an array of weight coefficients $w_0$ and $w_1$ should be prepared. Then, an intermediate image K composed of an arrangement of the individual pixels M[x,y] and the attribute parameters $p_1$ should be generated such that the kernel is applied to the individual pixels M[x,y] and the attribute parameters $p_1$.

For example, the intermediate image K can be generated by dividing the image M into vertical strip-like image segments having a width of 1 dot, and interposing an array of pixels that has a width of 1 dot and has the attribute parameter $p_1$ as the pixel value, between adjacent strip-like image segments. That is, the pixel values of the individual pixels of the intermediate image K after this interposing process are represented by:

$$K[2x,y] = M[x,y];$$

$$K[2x+1,y] = p_1$$

where M[x,y] indicates individual pixels and $p_1$ indicates an attribute parameter.

Figure 10:
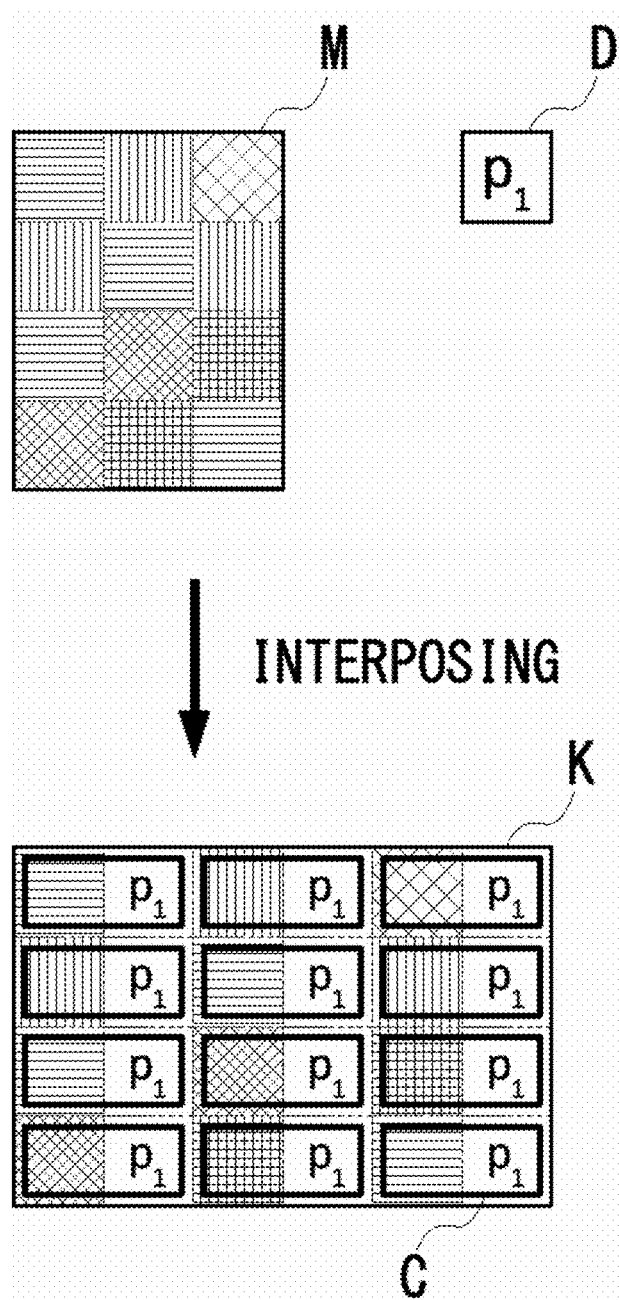
FIG. 10 is an explanatory diagram illustrating an exemplary application of a kernel C to an intermediate image K generated from a feature map M.

FIG. 10 is an explanatory diagram illustrating an exemplary application of a kernel C to the intermediate image K generated from the feature map M. In FIG. 10, the image M, which is an input feature map, has a pixel size of 3 ×4 dots and has pixel values represented by hatching, in order to facilitate an understanding. As illustrated in FIG. 10, the image M is divided into vertical strip-like image segments, between which pixels D having the attribute parameter $p_1$ as the pixel value are inserted.

The convolution kernel C has a width of 2 dots and a height of 1 dot, as illustrated as M in this figure. The stride is defined to have the size identical to the convolution kernel, that is, a horizontal length of 2 dots and a vertical length of 1 dot. Each of the thick lines in this figure surrounds a group of pixels that provides a single feature value of the feature map N generated by application of the kernel C with this stride.

This convolution operation can yield a new feature map N as follows:

$$N[x,y] = \sum_{j=0}^{1} w_j K[2x+j,y]$$

This operation is a general convolution operation executed in image processing. The use of the library contributes to rapid learning and determination.

Figure 11:
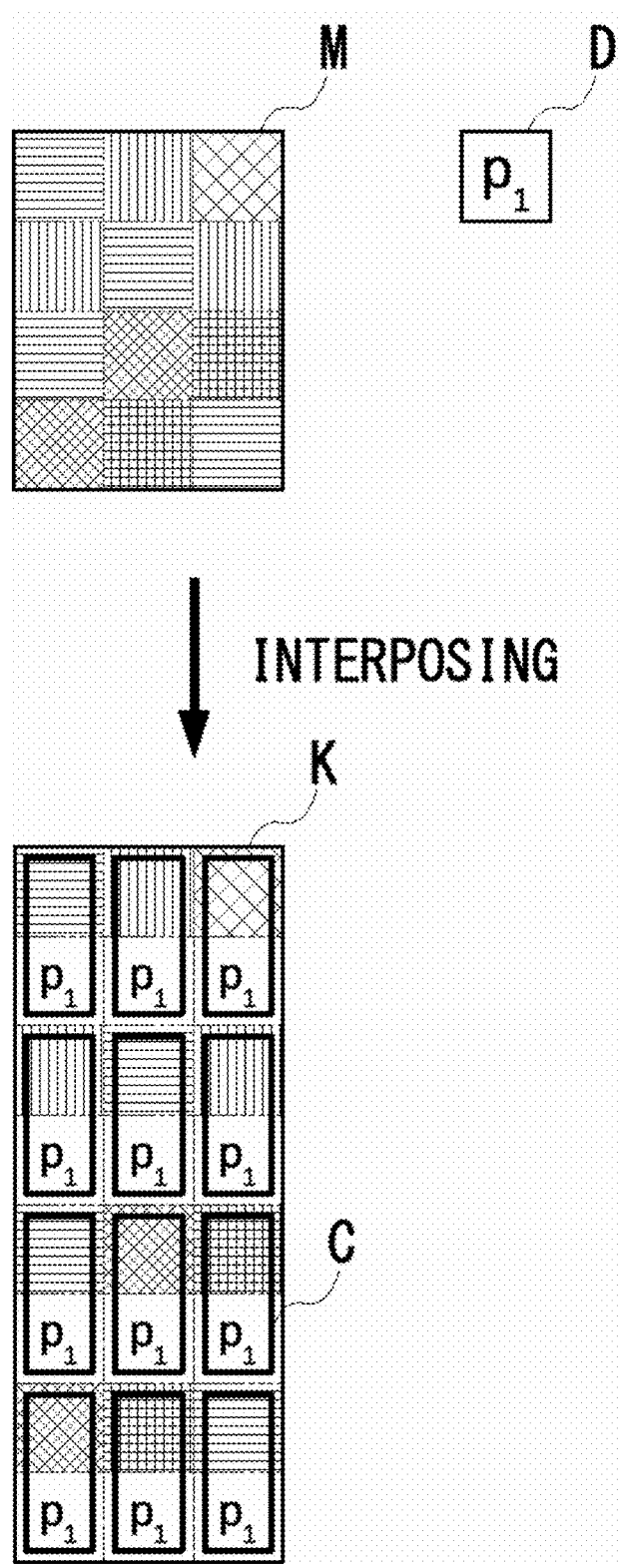
FIG. 11 is an explanatory diagram illustrating another exemplary application of a kernel C to an intermediate image K generated from a feature map M.

Although the first index of the feature map is used in the interposing process of attribute parameters in the above example, the second index may also be used. In this case, the pixel values of the individual pixels of the intermediate image K are represented by:

$$K[x,2y] = M[x,y];$$

$$K[x,2y+1] = p_1$$

where M[x,y] indicates individual pixels and $p_1$ indicates an attribute parameter. FIG. 11 is an explanatory diagram illustrating another exemplary application of the kernel C to the intermediate image K generated from the feature map M. FIG. 11 illustrates the relationship between the image M, the intermediate image K, and the kernel C, as in the above example.

In this case, the size of the convolution kernel C and the stride should be defined to be a width (horizontal length) of 1 dot and a height (vertical length) of 2 dots. The convolution operation of the target image M and the attribute parameter is represented by:

$$N[x,y] = \sum_{j=0}^{1} w_j K[x,2y+j]$$

In general, any index may be used in the interposing process of the A number of attribute parameters into the feature map having the L dimensions. The following explanation focuses on an exemplary case of using the first index in the interposing process. First, the intermediate image K is generated as follows:

$$K[(A+1)i_1, i_2, \ldots, i_L] = M[i_1, i_2, \ldots, i_L];$$

$$K[(A+1)i_1 + 1, i_2, \ldots, i_L] = p_1;$$

$$K[(A+1)i_1 + 2; i_2, \ldots, i_L] = p_2;$$

$$\ldots;$$

$$K[(A+1)i_1 + A, i_2, \ldots, i_L] = p_A$$

Then, the convolution operation, in which the kernel size and the stride are equal to (A+1)×1× ... ×1, and which is represented by:

$$N[x,y] = \sum_{j=0}^{A} w_j K[(A+1)x+j, y]$$

is executed to yield a feature map N.

In another exemplary case of using the k-th index in the interposing process, the generated intermediate image K is represented by:

$$K[(A+1)i_1, i_2, \ldots, i_L] = M[i_1, i_2, \ldots, i_L];$$

$$K[(A+1)i_1 + 1, i_2, \ldots, i_L] = p_1;$$

$$K[(A+1)i_1 + 2; i_2, \ldots, i_L] = p_2;$$

$$\ldots;$$

$$K[(A+1)i_1 + A, i_2, \ldots, i_L] = p_A$$

where the kernel size and the stride are equal to A+1 for the k-th index, and equal to 1 for the other indexes.

Figure 12:
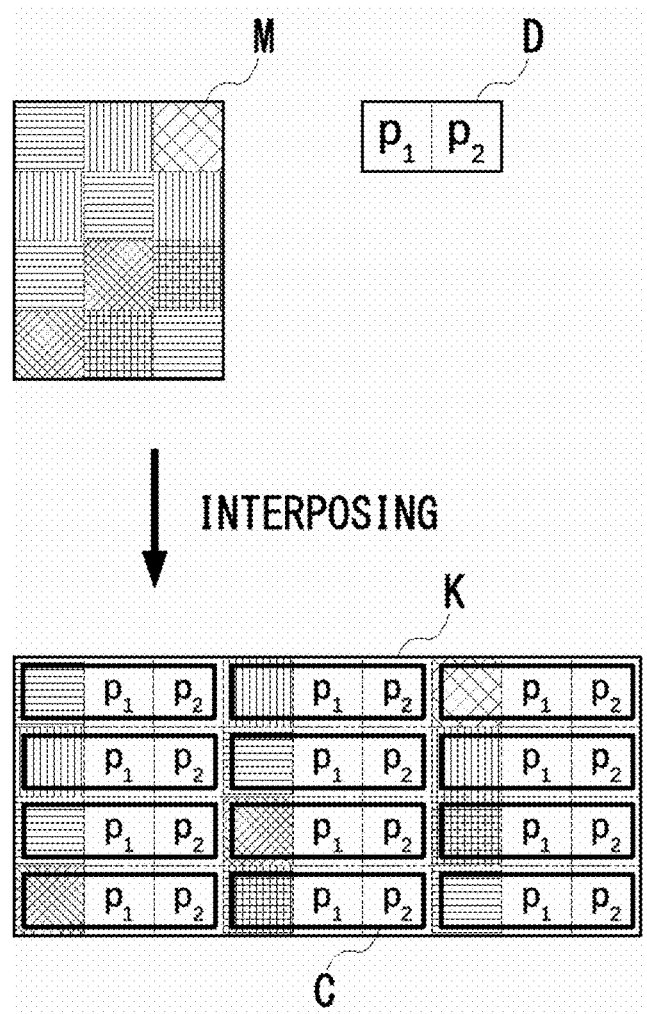
FIG. 12 is an explanatory diagram illustrating still another exemplary application of a kernel C to an intermediate image K generated from a feature map M.

FIG. 12 is an explanatory diagram illustrating still another exemplary application of the kernel C to the intermediate image K generated from the feature map M.

FIG. 12 illustrates the intermediate image K and the kernel C as in the above examples, in the case of using the first index of the two-dimensional feature map M having a size of 3×4 dots in the interposing process of the pixels D each having two attribute parameters.

The feature map may also be an RGB image (three-primary-color image). In this case, the feature map is expressed in three dimensions. Specifically, the X-axis direction in the image is a first dimension, the Y-axis direction is a second dimension, and the direction of RGB color channels is a third dimension.

The libraries TensorFlow and Keras support convolution operations in the color channel (third index) direction as well as the X-axis (horizontal, first index) direction and the Y-axis (vertical, second index) direction.

Examples of convolution operations in the color channel direction include an operation for converting an RGB image into a gray scale image. The rapid learning and determination are available also when using the third index in the convolution operation.

For example, in a convolution operation of a gray scale image (target image) and one or two attribute parameters, the rapid learning and determination can be achieved by applying the gray scale image to any of the RGB channel, filling the pixels in the other channels with the values of the attribute parameters, and then executing the convolution operation in the RGB direction.

Alternatively, the time-axis direction may be introduced as an index following the third index. A convolution operation in the time-axis direction is effective to extract features of a moving image using an AI library. This configuration also demands a rapid library responsible for a convolution operation for an index following the third index. This library enables a doctor to conduct various types of diagnosis by observing a variation with time in a diseased area with reference to different images of the identical subject taken at certain time intervals.

If time-series photographs are unavailable in this configuration, the attribute parameters should be arranged in the time-axis direction and then convolved in the time-axis direction.

Figure 13:
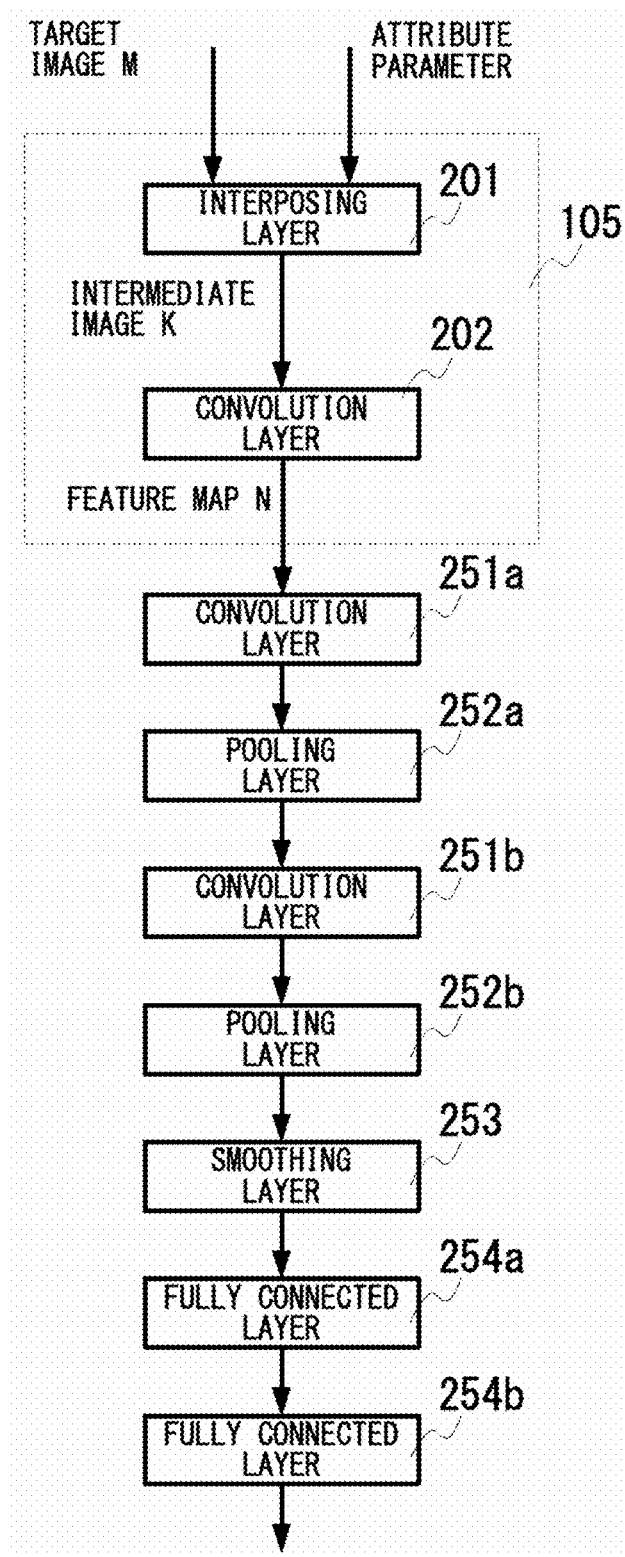
FIG. 13 is an explanatory diagram illustrating an exemplary configuration of image filters in a neural network according to the embodiment.

FIG. 13 is an explanatory diagram illustrating an exemplary configuration of image filters in the neural network according to the embodiment. This exemplary configuration is aimed at learning and determination of the level of risk of intraocular surgery on the basis of a photograph of corneal endothelial cells in a subject and the age of the subject. The configuration will now be described with reference to FIG. 13.

The target image M is received by the receiver 102. As illustrated in this figure, the interposing layer 201 interposes at least one attribute parameter at certain intervals into the target image M to generate an intermediate image K.

The convolution layer 202 convolves the resulting intermediate image K using a kernel, of which the size and stride are equal to A+1 (A indicates the number of attribute parameters) for the index used in the interposing process, and are equal to 1 for the other indexes. This operation yields a feature map N, in which the target image M and the attribute parameter are embedded, and which has the size identical to the target image M. That is, the functions of the convolution operator 105 are performed by the interposing layer 201 and the convolution layer 202.

The following layers have the same configuration as those of general convolution neural networks for classification. The figure illustrates an extremely simple and rapid configuration. Specifically, the configuration includes a convolution layer 251a, a pooling layer 252a, a convolution layer 251b, a pooling layer 252b, a smoothing layer 253, a fully connected layer 254a, and a fully connected layer 254b in sequence.

The output from the fully connected layer 254b may be any of binary, scalar, and vector values. In the case of binary value, the two values respectively correspond to a high risk and low risk of intraocular surgery. In the case of scalar value, the scalar value indicates a level of risk and is determined to be high or low in comparison to a threshold. In the case of vector value, a hyperplane for classification of vector values should be obtained using a support vector machine or the like.

The learning stage involves backpropagation based on comparison between the level of risk of intraocular surgery and the output from the fully connected layer 254b to automatically adjust the weight coefficients in each of the layers including the convolution layer 202 of the convolution operator 105. This configuration can achieve the learning function leading to comprehensive evaluation of the target image and the age.

At the classification stage, the fully connected layer 254b is provided with the target image and the attribute parameter of the subject and then outputs a value related to the level of risk of intraocular surgery.

The configuration ranging from the convolution layer 251a to the fully connected layer 254b may be arbitrarily varied depending on, for example, the usage, performance of the calculator, tendency in trial experiments, and experience of the designer. This embodiment is characterized in that a general neural network or the like for image recognition can be applied in the original state like a library to the configuration of the layers related to the process after the convolution operation of the individual pixels of the target image and the attributed parameter.

The convolution operation of the target image and the attribute parameter is performed in the initial layer, and the resulting image is then transferred to the subsequent layer in the above-described example. Alternatively, the attribute parameter may be convolved into an intermediate target map generated by convolution and pooling operations to the target image.

In other words, the convolution operator 105 including the interposing layer 201 and the convolution layer 202 can be disposed between any two adjacent layers in the neural network. The layer for convolving the feature values of the feature map and the attribute parameter is thus inserted between any two adjacent layers in the neural network, to thereby achieve learning and determination based on integration of the target image and the attribute parameter. The portion between the layers to receive the convolution layer and the configuration of the other layers can be defined depending on results of preliminary experiments or the like.

Alternatively, the convolution layer 202 may execute a convolution operation of the individual elements of the feature map and the attribute parameter by generating a library with the GPU or the like, without explicit generation of the intermediate image K by the interposing layer 201.

Experiment Results

As an exemplary experiment, the learning and classification were performed based on target images extracted from photographs of corneal endothelial cells of subjects and the ages of the subjects. The subjects were 51 people in total in ages ranging from 34 to 88 years old and were composed of 25 negative (low-risk) people and 26 positive (high-risk) people.

The photograph of corneal endothelial cells of each subject was an 8-bit gray scale image having a size of approximately 300×480 dots. One to twenty target images each having a size of 56×56 dots were extracted from a relatively unclear area of each photograph without a white line or dot drawn by a doctor or medical technician. The number of sets of the target images and the ages was 661 in total.

The above-described classification device 101 was caused to learn 528 learning data sets (approximately 80% of the whole sets) selected from the whole sets at random. The rate of accuracy of classification was then acquired using the rest 133 data sets (approximately 20% of the whole sets) as classifying data sets. This trial was repeated 100 times.

The results were compared to those of an existing classification technique A based only on target images without referring to ages, and those of an existing classification technique B based on feature maps and ages concatenated using the Concatenate function in a neural network.

In this embodiment, a convolution operation of an age into a target image was executed in the initial layers (in the interposing layer 201 and the convolution layer 202), and the operations in the subsequent layers (from the convolution layer 251a to the fully connected layer 254b) was achieved by the neural network having the configuration identical to that of the existing technique A.

This experiment revealed that the embodiment achieved an improved rate of accuracy of 87.48%, while the existing technique A provided an accuracy rate of 76.64% and the existing technique B provided an accuracy rate of 80.52%.

Other Embodiments

In the above-described embodiment, the pixel columns (or pixel rows) of the feature map M and the columns (or rows) of the attribute parameter D are alternately arranged in the interposing layer 201 to yield the intermediate image K. In contrast, in another embodiment, the process of the alternate arrangement is followed by further addition of the columns (or rows) of the attribute parameter D in a protruding manner. This protruding area is called a padded area, while the original area including the alternate arrangement of the pixels derived from the feature map M and the pixels derived from the attribute parameter D is called an unpadded area.

In the case where the attribute parameters are added in a protruding manner, the arrangement in the unpadded area has wide variations depending on what element is located at the position within the kernel for a pixel of the feature map (the left position in the example in the figure) and at the position within the kernel for the attribute parameter (the right position in the example in the figure). The arrangement also has wide variations depending on the number of rows of added attribute parameters.

Figure 14:
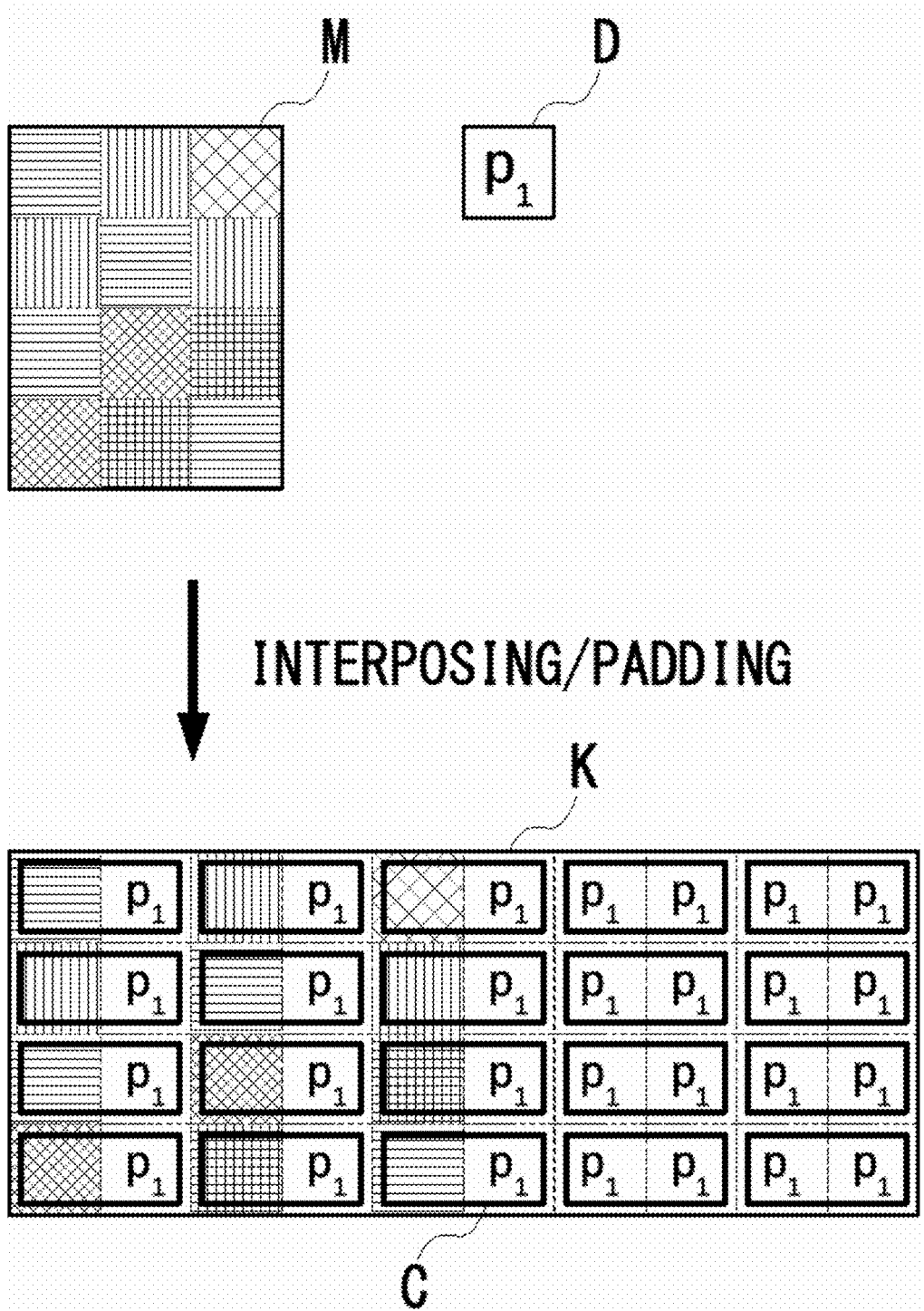
FIG. 14 is an explanatory diagram illustrating an exemplary padding process.

FIG. 14 is an explanatory diagram illustrating an exemplary padding process. The following explanation refers to the example illustrated in FIG. 14.

In this example, the attribute parameters are added at both of the right and left positions within the kernel. That is, the interposing process in the padded area (W≤x<W+P) is represented by:

$K[2x,y]=p_1;$ $K[2x+1,y]=p_1$

A classification experiment was conducted using this exemplary padding process under the above-described specification of experiment based on photographs of corneal endothelial cells and the ages. The amount of protrusion P was defined to be within the range of 50% and 100% of the width W of the original target map (P=W/2 and P=W). This configuration was able to achieve an improved accuracy rate of 88.67% to 88.89%.

Figure 15:
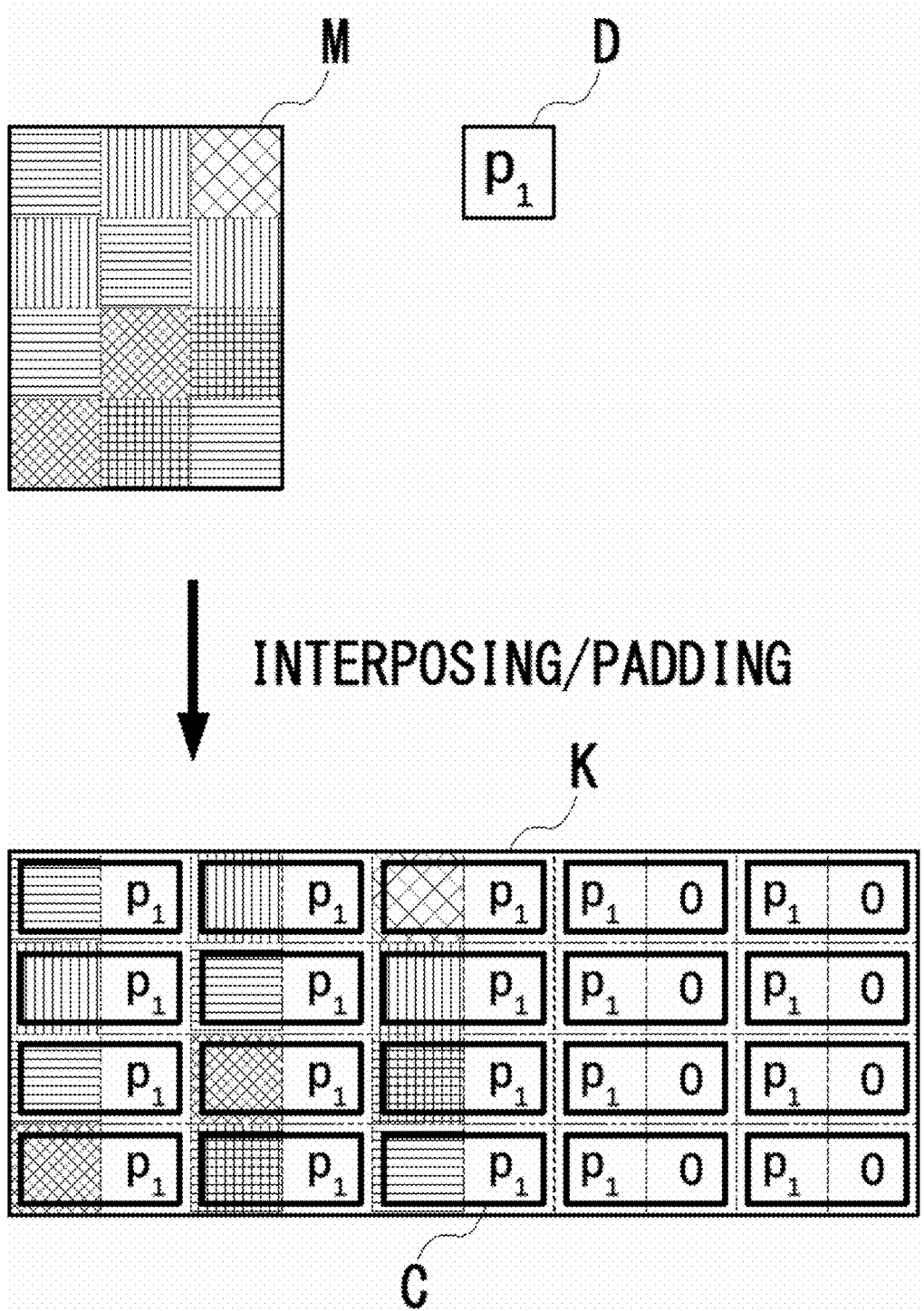
FIG. 15 is an explanatory diagram illustrating another exemplary padding process.

FIG. 15 is an explanatory diagram illustrating another exemplary padding process. The following explanation refers to the example illustrated in FIG. 15.

In this example, the attribute parameter is disposed at the left position and the value 0 is disposed at the right position within the kernel, unlike the above example. That is, the interposing process in the padded area (W≤x<W+P) is represented by:

$K[2x,y]=p_1;$ $K[2x+1,y]=0$

The above-explained experiment was conducted also in this example. As a result, the configuration was able to further improve the discrimination performance and thus provided an accuracy rate of 88.8% in the case of P=W/2, and 89.2% in the case of P=W.

Such improvement seemed to be achieved because the over-fitting problem was prevented due to the placement of the value derived from the attribute parameter at the position within the kernel, where the value is multiplied by a weight coefficient for the pixel derived from the feature map.

If a plurality of attribute parameters is added, the discrimination performance can further be improved by configuring the padded area as follows:

$K[(A+1)i_1, i_2, \ldots, i_L] = e$ $K[(A+1)i_1 + 1, i_2, \ldots, i_L] = p_1;$ $K[(A+1)i_1 + 2; i_2, \ldots, i_L] = p_2;$

...;

$K[(A+1)i_1 + A, i_2, \ldots, i_L] = p_A$ or $K[(A+1)i_1, i_2, \ldots, i_L] = e$ $K[(A+1)i_1 + 1, i_2, \ldots, i_L] = 0;$ $K[(A+1)i_1 + 2; i_2, \ldots, i_L] = 0;$

...;

$K[(A+1)i_1 + A, i_2, \ldots, i_L] = 0$ where e indicates a simple or weighted mean value of the attribute parameters.

The padded area $K[(A+1)i_1+1, i_2, \ldots, i_L]$ to $K[(A+1)i_1+A, i_2, \ldots, i_L]$ may also be filled with a constant other than 0 or a random number, for example, instead of the attribute parameters $p_1$ to $p_A$ and 0. Alternatively, the pixel values of the feature map M may be redundantly added or added after thinning.

Alternatively, the value e may be the mean value of each attribute parameter of subjects in learning data. For example, based on calculation of the mean age of the subjects in the learning data, the padding process was conducted such that e (mean age) and $p_1$ (age of the subject) were arranged for each subject, in the condition of P=W under the above-described specification of experiment. The resulting accuracy rate was 91.3%.

The following explanation focuses on a conceivable procedure of acquiring a weighted mean value e for each subject in the case where a plurality of attribute parameters is assigned to the subject. First, learning is performed without the padding process to acquire weights $w_0, w_1, w_2, \ldots$, and $w_A$ in a kernel C.

Second, the mean value e is calculated from these weights as follows:

$$e = \Sigma_{j=1}^{A} w_j p_j / \Sigma_{j=1}^{A} w_j$$

Third, the above-explained padding process is conducted, and the learning is then performed again.

After calculation of the weighted mean value e of the attribute parameters for each subject in the learning data, the padding of repetition of e, $p_1, p_2, \ldots,$ and $p_A$ is conducted. This process corresponds to the padding of repetition of the ages of the subjects (accuracy rate of 88.67% to 88.89%) in the above exemplary experiment.

Alternatively, the mean value E of the weighted mean values e may be calculated for all the subjects in the learning data, followed by the padding of repetition of e, $p_1, p_2, \ldots, $ and $p_A$. This process corresponds to the padding of repetition of the mean age of the subjects in the learning data and the ages of the subjects (accuracy rate of 91.3%) in the above exemplary experiment.

As explained above, the discrimination performance can further be improved by padding the value derived from the attribute parameter at the position within the kernel in the padded area, which position corresponds to the position of the feature value derived from the feature map in the unpadded area.

Any of the above-explained padding procedures may be selected appropriately for the target to provide the highest accuracy rate, after conducting preliminarily experiments as required, depending on the usage or the like.

Other Exemplary Applications

In the above embodiments, the disclosure is applied to a combination of a photograph of corneal endothelial cells in a subject and the age of the subject, as a specific example. The classification device 101, however, may be applied to any diagnosis and determination based on a combination of a medical photograph and various attribute parameters of a patient.

Furthermore, the classification device 101 may also contribute to matching of couples in a marriage agency or prediction of future popularity of a candidate of show-business celebrities, such as actors and models. The classification device 101 is effective in these fields because a face photograph of a target person and the attribute parameters (for example, age, sex, and height) of the person are the important factors.

CONCLUSION

As described above, a classification device according to a first aspect of the disclosure includes: a receiver configured to receive a target image that captures a target and at least one attribute parameter associated with the target; and a classifier configured to classify the target using a neural network. The neural network includes a convolution operator configured to convolve individual elements of a provided feature map and the received at least one attribute parameter.

In the classification device according to the first aspect, the feature map provided to the neural network may be the received target image.

In the classification device according to the first aspect, the convolution operator may apply a convolution kernel to an intermediate map with a stride having a size corresponding to the size of the convolution kernel and the size of predetermined intervals, the intermediate map being configured by interposing at least one attribute element at the predetermined intervals between feature elements included in the provided feature map, the at least one attribute element respectively having the received at least one attribute parameter as an element value.

In the classification device according to the first aspect, the convolution kernel may be used in convolution of one of the feature elements included in the feature map and the at least one attribute element.

In the classification device according to the first aspect, one of a width and a height of the size of the convolution kernel may be equal to 1 and another of the width and the height may be equal to the value calculated by adding 1 to the number of the at least one attribute element.

In the classification device according to the first aspect, the convolution operator may further execute padding to at least one side of a circumference of the provided feature map, and the convolution operator may execute padding of an element at a position corresponding to the feature element in each subarea corresponding to the convolution kernel to be applied in a padded area, the padded element having a value derived from the attribute parameter.

In the classification device according to the first aspect, the received at least one attribute parameter may be a single attribute parameter, and the value derived from the attribute parameter may indicate a value of the received attribute parameter.

In the classification device according to the first aspect, the received at least one attribute parameter may include a plurality of attribute parameters, and the value derived from the attribute parameter may indicate a simple mean value or a weighted mean value of the received attribute parameters.

The classification device according to the first aspect may perform learning without the padding to acquire a kernel, execute the padding of the weighted mean value reflecting weights provided by the acquired kernel, and then perform learning again.

A classification method according to a second aspect of the disclosure includes: a receiving step of receiving a target image that captures a target and at least one attribute parameter associated with the target by a classification device; and a classifying step of classifying the target by the classification device using a neural network. In the neural network, individual elements of a provided feature map and the received at least one attribute parameter are convolved.

A program according to a third aspect of the disclosure causes a computer to: receive a target image that captures a target and at least one attribute parameter associated with the target; and classify the target using a neural network. The neural network includes a convolution operator configured to convolve individual elements of a provided feature map and the received at least one attribute parameter.

A program according to a fourth aspect of the disclosure causes a computer to: obtain a feature map associated with a target and at least one attribute parameter associated with the target, and convolve individual elements of the obtained feature map and the obtained at least one attribute parameter and thereby generate a new feature map.

This program may be stored on a non-transitory computer-readable information recording medium to be distributed and sold. The program may also be distributed and sold via a transitory transmission medium, such as a computer communication network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2017-223696, filed on Nov. 21 (Tuesday), 2017, the entire disclosure of which is incorporated by reference herein.

INDUSTRIAL APPLICABILITY

The disclosure can provide a classification device, a classification method, a program, and a non-transitory information recording medium for classifying targets using a neural network on the basis of a target image that captures each target and at least one attribute parameter associated with the target.

REFERENCE SIGNS LIST

101 Classification device
102 Receiver
103 Neural network unit
104 Classifier
105 Convolution operator
201 Interposing layer
202 Convolution layer
251a, 251b Convolution layer
252a, 252b Pooling layer
253 Smoothing layer
254a, 254b Fully connected layer

What is claimed is:

1. A classification device comprising:
a receiver configured to receive a target image that captures a target and at least one attribute parameter associated with the target; and
a classifier configured to classify the target using a neural network, wherein
the neural network comprises a convolution operator configured to convolve individual elements of a provided feature map and the received at least one attribute parameter,
the convolution operator being configured to apply a convolution kernel to an intermediate map with a stride having a size corresponding to a size of the convolution kernel and a size of predetermined intervals, the intermediate map being configured by interposing at least one attribute element at the predetermined intervals between feature elements included in the provided feature map, the at least one attribute element respectively having the received at least one attribute parameter as an element value,
the convolution kernel being configured to be used in convolution of one of the feature elements included in the feature map and the at least one attribute element, and
one of a width and a height of the size of the convolution kernel is equal to 1 and another of the width and the height is equal to a value calculated by adding 1 to a number of the at least one attribute element.

2. The classification device according to claim 1, wherein the feature map provided to the neural network is the received target image.

3. A classification device comprising:
a receiver configured to receive a target image that captures a target and at least one attribute parameter associated with the target; and
a classifier configured to classify the target using a neural network, wherein
the neural network comprises a convolution operator configured to convolve individual elements of a provided feature map and the received at least one attribute parameter,
the convolution operator being configured to apply a convolution kernel to an intermediate map with a stride having a size corresponding to a size of the convolution kernel and a size of predetermined intervals, the intermediate map being configured by interposing at least one attribute element at the predetermined intervals between feature elements included in the provided feature map, the at least one attribute element respectively having the received at least one attribute parameter as an element value,
the convolution kernel being configured to be used in convolution of one of the feature elements included in the feature map and the at least one attribute element, and
the convolution operator being further configured to execute padding to at least one side of a circumference of the provided feature map, and
the convolution operator being configured to execute padding of an element at a position corresponding to the feature element in each subarea corresponding to the convolution kernel to be applied in a padded area, the padded element having a value derived from the attribute parameter.

4. The classification device according to claim 3, wherein the received at least one attribute parameter comprises a single attribute parameter, and
the value derived from the attribute parameter indicates a value of the received attribute parameter.

5. The classification device according to claim 3, wherein the received at least one attribute parameter comprises a plurality of attribute parameters, and
the value derived from the attribute parameter indicates a simple mean value or a weighted mean value of the received attribute parameters.

6. The classification device according to claim 5, wherein the classification device performs learning without the padding to acquire a kernel, executes the padding of the weighted mean value reflecting weights provided by the acquired kernel, and then performs learning again.

7. A classification method comprising:
a receiving step of receiving a target image that captures a target and at least one attribute parameter associated with the target by a classification device; and
a classifying step of classifying the target by the classification device using a neural network, wherein
in the neural network, individual elements of a provided feature map and the received at least one attribute parameter are convolved
the convolution operator applies a convolution kernel to an intermediate map with a stride having a size corresponding to a size of the convolution kernel and a size of predetermined intervals, the intermediate map being configured by interposing at least one attribute element at the predetermined intervals between feature elements included in the provided feature map, the at least one attribute element respectively having the received at least one attribute parameter as an element value,
the convolution kernel is used in convolution of one of the feature elements included in the feature map and the at least one attribute element, and one of a width and a height of the size of the convolution kernel is equal to 1 and another of the width and the height is equal to a value calculated by adding 1 to a number of the at least one attribute element.

8. A non-transitory computer-readable information recording medium storing a program causing a computer to:
receive a target image that captures a target and at least one attribute parameter associated with the target; and
classify the target using a neural network, wherein
the neural network comprises a convolution operator configured to convolve individual elements of a provided feature map and the received at least one attribute parameter
the convolution operator applies a convolution kernel to an intermediate map with a stride having a size corresponding to a size of the convolution kernel and a size of predetermined intervals, the intermediate map being configured by interposing at least one attribute element at the predetermined intervals between feature elements included in the provided feature map, the at least one attribute element respectively having the received at least one attribute parameter as an element value,
the convolution kernel is used in convolution of one of the feature elements included in the feature map and the at least one attribute element, and
one of a width and a height of the size of the convolution kernel is equal to 1 and another of the width and the height is equal to a value calculated by adding 1 to a number of the at least one attribute element.

9. A classification method comprising:
a receiving step of receiving a target image that captures a target and at least one attribute parameter associated with the target by a classification device; and
a classifying step of classifying the target by the classification device using a neural network,
wherein
in the neural network, individual elements of a provided feature map and the received at least one attribute parameter are convolved,
the convolution operator applies a convolution kernel to an intermediate map with a stride having a size corresponding to a size of the convolution kernel and a size of predetermined intervals, the intermediate map being configured by interposing at least one attribute element at the predetermined intervals between feature elements included in the provided feature map, the at least one attribute element respectively having the received at least one attribute parameter as an element value,
the convolution kernel is used in convolution of one of the feature elements included in the feature map and the at least one attribute element,
the convolution operator further executes padding to at least one side of a circumference of the provided feature map, and
the convolution operator executes padding of an element at a position corresponding to the feature element in each subarea corresponding to the convolution kernel to be applied in a padded area, the padded element having a value derived from the attribute parameter.

10. A non-transitory computer-readable information recording medium storing a program causing a computer to:
receive a target image that captures a target and at least one attribute parameter associated with the target; and
classify the target using a neural network,
wherein
the neural network comprises a convolution operator configured to convolve individual elements of a provided feature map and the received at least one attribute parameter,
the convolution operator applies a convolution kernel to an intermediate map with a stride having a size corresponding to a size of the convolution kernel and a size of predetermined intervals, the intermediate map being configured by interposing at least one attribute element at the predetermined intervals between feature elements included in the provided feature map, the at least one attribute element respectively having the received at least one attribute parameter as an element value,
the convolution kernel is used in convolution of one of the feature elements included in the feature map and the at least one attribute element, the convolution operator further executes padding to at least one side of a circumference of the provided feature map, and
the convolution operator executes padding of an element at a position corresponding to the feature element in each subarea corresponding to the convolution kernel to be applied in a padded area, the padded element having a value derived from the attribute parameter.

\* \* \* \* \*